(12) United States Patent
Segaert et al.

(10) Patent No.: US 11,781,326 B2
(45) Date of Patent: Oct. 10, 2023

(54) PANEL FOR FORMING A FLOOR COVERING, METHOD FOR MANUFACTURING SUCH PANELS AND GRANULATE APPLIED HEREWITH

(71) Applicant: FLOORING INDUSTRIES LIMITED, SARL, Bertrange (LU)

(72) Inventors: Martin Segaert, Ypres (BE); Christophe Naeyaert, Jabbeke (BE)

(73) Assignee: FLOORING INDUSTRIES LIMITED, SARL, Bertrange (LU)

( * ) Notice: Subject to any disclaimer, the term of this patent is extended or adjusted under 35 U.S.C. 154(b) by 0 days.

(21) Appl. No.: 17/668,906

(22) Filed: Feb. 10, 2022

(65) Prior Publication Data

US 2022/0162862 A1     May 26, 2022

Related U.S. Application Data

(63) Continuation of application No. 16/808,874, filed on Mar. 4, 2020, now Pat. No. 11,299,893, which is a
(Continued)

(30) Foreign Application Priority Data

Jun. 1, 2012 (BE) .................................. 2012/0370
Jul. 6, 2012 (BE) .................................. 2012/0474

(51) Int. Cl.
    *B32B 3/10*          (2006.01)
    *E04F 15/10*      (2006.01)
(Continued)

(52) U.S. Cl.
    CPC .............. *E04F 15/107* (2013.01); *B27N 3/06* (2013.01); *B29C 43/006* (2013.01); *B29C 43/30* (2013.01);
(Continued)

(58) Field of Classification Search
None
See application file for complete search history.

(56) References Cited

U.S. PATENT DOCUMENTS 4,234,366 A    11/1980   Brewer
4,778,547 A    10/1988   Becker
(Continued)

FOREIGN PATENT DOCUMENTS

CN     101909836 A     12/2010
CN     102123840 A      7/2011
(Continued)

OTHER PUBLICATIONS

International Search Report (ISR) dated Oct. 29, 2013, for PCT/IB2013/054480.
(Continued)

*Primary Examiner* — Christopher M Polley
(74) *Attorney, Agent, or Firm* — WORKMAN NYDEGGER

(57) ABSTRACT

A panel for forming a floor covering has a substrate including at least a layer of thermoplastic material, where the panel, above the layer, has at least also a printed décor and a translucent or transparent wear layer. The layer also includes at least individual fibers having a length greater than 1 millimeter, where the individual fibers are loose and freely distributed with the layer of thermoplastic material.

11 Claims, 1 Drawing Sheet

Related U.S. Application Data continuation of application No. 15/671,754, filed on Aug. 8, 2017, now Pat. No. 10,619,357, which is a continuation of application No. 14/402,011, filed as application No. PCT/IB2013/054480 on May 30, 2013, now Pat. No. 9,758,973.

(51) Int. Cl.

| | | |
|---|---|---|
| *B29C 70/08* | (2006.01) | |
| *B29C 43/30* | (2006.01) | |
| *B29C 43/48* | (2006.01) | |
| *B27N 3/06* | (2006.01) | |
| *B32B 27/12* | (2006.01) | |
| *B32B 27/30* | (2006.01) | |
| *B32B 37/10* | (2006.01) | |
| *B32B 37/24* | (2006.01) | |
| *B32B 38/00* | (2006.01) | |
| *B29C 70/50* | (2006.01) | |
| *B29C 43/00* | (2006.01) | |
| *E04F 15/08* | (2006.01) | |
| *B32B 5/02* | (2006.01) | |
| *D06N 3/00* | (2006.01) | |
| *E04F 15/02* | (2006.01) | |
| *B29L 31/00* | (2006.01) | |
| *B32B 37/00* | (2006.01) | |
| *B29K 101/12* | (2006.01) | |
| *B29K 309/08* | (2006.01) | |

(52) U.S. Cl.
CPC .......... *B29C 43/305* (2013.01); *B29C 43/48* (2013.01); *B29C 70/081* (2013.01); *B29C 70/506* (2013.01); *B32B 5/024* (2013.01); *B32B 27/12* (2013.01); *B32B 27/304* (2013.01); *B32B 37/1027* (2013.01); *B32B 37/24* (2013.01); *B32B 38/145* (2013.01); *D06N 3/0022* (2013.01); *E04F 15/02038* (2013.01); *E04F 15/08* (2013.01); *E04F 15/102* (2013.01); *E04F 15/105* (2013.01); *B29C 2043/483* (2013.01); *B29K 2101/12* (2013.01); *B29K 2309/08* (2013.01); *B29L 2031/732* (2013.01); *B32B 37/0015* (2013.01); *B32B 2305/08* (2013.01); *B32B 2305/10* (2013.01); *B32B 2305/22* (2013.01); *B32B 2305/30* (2013.01); *B32B 2307/412* (2013.01); *B32B 2307/414* (2013.01); *B32B 2307/7242* (2013.01); *B32B 2307/734* (2013.01); *B32B 2309/105* (2013.01); *B32B 2315/08* (2013.01); *B32B 2315/085* (2013.01); *B32B 2327/06* (2013.01); *B32B 2398/20* (2013.01); *B32B 2419/00* (2013.01); *B32B 2471/00* (2013.01); *E04F 2201/0153* (2013.01); *E04F 2201/0161* (2013.01); *E04F 2201/023* (2013.01); *Y10T 428/24868* (2015.01)

(56) References Cited

U.S. PATENT DOCUMENTS

| | | | |
|---|---|---|---|
| 6,306,318 | B1 | 10/2001 | Ricciardelli et al. |
| 8,431,054 | B2 | 4/2013 | Pervan et al. |
| 9,522,489 | B2 | 12/2016 | Anderson et al. |
| 2002/0136862 | A1 | 9/2002 | Dong |
| 2002/0155274 | A1 | 10/2002 | Ramesh |
| 2002/0168503 | A1 | 11/2002 | Dong et al. |
| 2003/0024200 | A1 | 2/2003 | Moriau et al. |
| 2004/0192141 | A1 | 9/2004 | Yang |
| 2005/0166513 | A1 | 8/2005 | Vanderhoef |
| 2010/5016651 | | 8/2005 | Vanderhoef |
| 2009/0155612 | A1* | 6/2009 | Pervan ............... B32B 21/14 428/326 |
| 2010/0300030 | A1 | 12/2010 | Pervan et al. |
| 2011/0117340 | A1 | 5/2011 | Oldorff |
| 2011/0177308 | A1* | 7/2011 | Anderson ........... B44C 3/12 428/207 |
| 2011/0263174 | A1 | 10/2011 | Ketzer et al. |
| 2012/0244370 | A1 | 9/2012 | Sorger |
| 2012/0276348 | A1 | 11/2012 | Clausi et al. |
| 2014/0147585 | A1 | 5/2014 | Smith |
| 2016/0005868 | A1 | 1/2016 | Wei |

FOREIGN PATENT DOCUMENTS

| | | |
|---|---|---|
| CN | 102398369 A | 4/2012 |
| EP | 1026341 A2 | 8/2000 |
| EP | 1938963 A1 | 7/2008 |
| EP | 2153967 A1 | 2/2010 |
| EP | 2339092 A1 | 6/2011 |
| EP | 2402155 A1 | 1/2012 |
| GB | 1248060 A | 9/1971 |
| JP | S62160211 A | 7/1987 |
| JP | H05061342 U | 8/1993 |
| JP | H10037443 A | 2/1998 |
| JP | H11510869 A | 9/1999 |
| JP | 2010007332 A | 1/2010 |
| WO | 9747834 A1 | 12/1997 |
| WO | 2008122668 A1 | 10/2008 |
| WO | 2009065769 A2 | 5/2009 |
| WO | 2010023042 A1 | 3/2010 |
| WO | 2012004701 A2 | 1/2012 |
| WO | 2012016916 A1 | 2/2012 |

OTHER PUBLICATIONS

Written Opinion dated Oct. 29, 2013, for PCT/IB2013/054480.
Belgian Search Report dated Feb. 18, 2013, for BE 2012/0370.
Belgian Search Report dated Feb. 20, 2013, BE 2012/0474.

* cited by examiner

PANEL FOR FORMING A FLOOR COVERING, METHOD FOR MANUFACTURING SUCH PANELS AND GRANULATE APPLIED HEREWITH

BACKGROUND OF THE INVENTION

1. Field of the Invention

This invention relates to panels for forming a floor covering, to a method for manufacturing such panels, and to a granulate applied therewith.

More particularly, the invention relates to panels comprising at least a layer, more particularly a substrate layer, of thermoplastic material. Further, such panels may also comprise, above said layer, at least a top layer with a printed decor and a translucent or transparent wear layer.

In particular, the present invention relates to panels of the type which, on two or more opposite edges, comprises coupling means or coupling parts with which two of such floor panels can be coupled at said edges in such a manner that they are mutually locked in a horizontal direction perpendicular to the respective edge and in the plane of the floor panels, as well as in a vertical direction perpendicular to the plane of the floor panels. Such floor panels can be applied for composing a so-called floating floor covering, wherein the floor panels are connected to each other at their edges, however, lie freely on the underlying surface.

2. Related Art

Such panels are known, for example, from EP 1 938 963, EP 2 339 092 A1 and WO 2010/023042. From these documents, more particularly vinyl-based floor panels are known for forming a floating floor covering. Such vinyl-based floor panels mostly have a thickness of 3 to 5 millimeters and have a high material density. The respective core of the panels is composed of one or more layers of thermoplastic material, for example, soft PVC, which can comprise fillers. Above the print, a transparent thermoplastic layer and possibly a superficial layer of lacquer are provided. According to EP 2 339 092 A1, a reinforcing layer on the basis of glass fiber can be applied.

The panels of the state of the art show the disadvantage that they are strongly subjected to shrinkage and expansion under the influence of temperature. Shrinkage and expansion may lead to that the floor covering or the individual panels are pushed upward, and, for example, to a mutual release of the coupling parts, or to the phenomenon that the individual panel-shaped elements will drift apart, whereby gaps may occur. The features of the panels of the state of the art are such that problems may occur already with warming due to incident sunlight, for example, at a window in a room.

From WO 2012/004701, it is known to apply a glass fiber layer or embedded profiles for increasing the dimensional stability of such panels. In particular, here the bending stiffness of the panels has been tackled.

U.S. Pat. No. 6,306,318 describes a method for recycling discarded carpets, wherein, starting from a molten mixture of a recyclate on the basis of discarded carpets and fresh soft PVC, flexible floor tiles having a minimum thickness of approximately 5 millimeters are produced by means of an injection molding process. The mixture comprises an amount of plasticizers of maximum 5 percent by weight. The obtained floor tiles have a uniform composition across their thickness and comprise 10 to 20 percent by weight of unmelted carpet fibers of polyamide or polyester, which are distributed uniformly across the thickness of these tiles. The fibers provide for a wear-resistant surface. As an alternative for the recyclate of discarded carpets, also recyclate of glass fiber-reinforced synthetic material (English: fiberglass) can be applied. In the case of carpet, it is started with carpet fibers of approximately 3.2 millimeters or more, wherein a reduction of the length during the process is avoided as much as possible. However, it can be expected that disintegrating the carpets and processing them in the extruder prior to injection molding in fact will lead to shortening the present fibers. It is unclear what the length of the glass fibers will be when starting from a recyclate of glass fiber-reinforced synthetic material. Further, it is unclear how many glass fibers will have been incorporated into the matrix of the tile and which type of glass fiber is applied. The obtained tile is relatively hard and the flexibility leaves much to be desired. This may lead to problems with the impact sound during use and an incapability of adapting to unevennesses of the underlying surface. The injection-molded tile comprises coupling means along the edges, however, these do not provide for a locking in vertical direction. Moreover, the precision of injection molding, in particular in the case of soft thermoplastic materials, is inferior. This method is time-consuming, and moreover there is little possibility of variation in the appearance of the wear side of the tiles. Such tiles possibly still show a strong dimensional change with changing temperature.

GB 1 248 060 describes, as an alternative of a method similar to that of U.S. Pat. No. 6,306,318, the possibility of manufacturing reinforced thermoplastic materials by means of a method wherein continuous fiber layers are stacked and pressed alternating with thermoplastic granulate layers. In this manner, a disintegration of the present fibers in the extruder is avoided. According to the examples, hard PVC can be applied as thermoplastic material.

SUMMARY OF THE INVENTION

The present invention relates to an alternative panel, which, in the first place, is intended as a floor panel for forming a floating floor covering. According to various preferred embodiments of the invention, also a solution is offered for one or more problems with the panels of the state of the art.

To this aim, the invention, according to its first independent aspect, relates to a panel for forming a floor covering, wherein this panel comprises at least a layer consisting of thermoplastic material, with the characteristic that said layer also comprises individual fibers, preferably of a length greater than 1 mm. By "individual fibers", it is meant that they as such do not form part of a layer or a prefabricated layer, such as a glass fiber cloth, but rather, for example, are distributed freely within the thermoplastic material, whether or not uniformly. The inventors have found that the use of such loose or individual fibers can contribute to the dimensional stability of the panels to a major extent, and then in particular can restrict the extent of expansion or shrinkage. Generally, such individual fibers seem better embedded in the thermoplastic material than, for example, a glass fiber cloth. Moreover, they can be active over a greater thickness of the thermoplastic material than such glass fiber fleece (non-woven) or glass fiber cloth (woven), such that shrinkage or expansion by shifting away over such glass fiber cloth largely can be prevented.

Preferably, the respective fibers have an average length of 3 millimeters or more. Good results have been obtained with fibers having an average length of approximately 4.5 millimeters. Preferably, the average length is shorter than 10 millimeters or even shorter than 6 millimeters.

Preferably, the respective layer comprises between 1 and 25 percent by weight of the respective fibers, and still better between 5 and 15 percent by weight, without including possible other fillers, such as chalk.

Preferably, glass fibers are applied for the fibers. Preferably, E-Glass is chosen, for example, as defined in DIN 1259. According to an alternative, steel fibers or other fibers, such as carbon fibers, aramid fibers or polyethylene fibers can be applied.

Preferably, moisture-resistant fibers are applied and, thus, no cellulose fibers, unless they are coated or treated, for example, by means of acetylation, in order to render them, at least to a certain extent, moisture-resistant.

Preferably, the fibers, for example, glass fibers, on average have a diameter situated between 1 and 100 micrometers or still better between 3 and 30 micrometers, wherein in various experiments the range between 5 and 25 micrometers has proven to be the best.

Preferably, the fibers are provided with a coating or a treatment which improves the adherence to the thermoplastic material. Preferably, the surface of the fibers is treated with a coupling agent, such as with silane.

Preferably, the fibers have a thermal expansion coefficient which is smaller than that of the thermoplastic material in which they are situated, and/or a Young's modulus which is higher than that of the thermoplastic material in which they are situated.

Preferably, fibers are applied having a Young's modulus of more than 40, still better of more than 60 GP a.

Preferably, fibers are applied having a thermal expansion coefficient of less than 30 µm/mK and still better of less than 5 µm/mK.

Preferably, said thermoplastic material relates to polyvinyl chloride, preferably semi-rigid or even soft polyvinyl chloride (PVC), namely PVC with plasticizers, for example, with a percentage of plasticizers in the PVC of more than 20 or more than 30 percent by weight. It is clear that instead of using PVC, it is also possible to apply polypropylene (PP), polyethylene (PET) or polyurethane (PUR).

Preferably, the panel of the invention also comprises, above said layer, at least a printed decor and a translucent or transparent wear layer provided there above. Said decor can consist of a print performed on a synthetic material film, for example, a printed PVC film, PU film, PP film, PET film. In the case of a PP film, this may relate, for example, to oriented polypropylene films. The wear layer preferably also comprises a thermoplastic material, such as PVC, PU, PP or PET. Preferably, the transparent thermoplastic wear layer is free from solid additives, such as ceramic particles for enhancing wear resistance, although this kind of particles as such is not excluded. However, the inventor has found that they can be omitted with the aim of obtaining good transparency while still maintaining an acceptable wear resistance, namely a wear resistance comparable to or better than that of a laminate panel of the AC2 or AC3 class, as measured according to EN 13329. The wear layer preferably has a thickness of minimum 0.15 millimeters and still better minimum 0.3 millimeters, however, preferably less than 1 millimeter, wherein 0.2 to 0.4 millimeters is a good value. With this good value, by means of the thermoplastic material of the wear layer alone, thus, without taking into account possible solid additives, already a sufficient wear resistance can be obtained for residential application. So, for example, it is possible to achieve an IP value (initial wear point) of 2000 or more in the Taber tests, as described in EN 13329, annex E.

According to an alternative, it is not excluded that the printed decor or the print might be provided on the underside of the wear layer.

Preferably, said thermoplastic layer also comprises at least a glass fiber cloth or glass fiber fleece. Preferably, this here relates to a so-called "non-woven", namely, a glass fiber fleece. The inventors have found that with a glass fiber fleece, better embedding in the thermoplastic material can be obtained and therefore a more efficient working of the glass fibers.

Preferably, the thermoplastic layer, which, according to the invention, comprises the individual fibers, relates to a substrate layer, namely a layer which extends underneath a top layer. Preferably, such layer is situated at least halfway in the thickness of the panels. In this manner, the risk of a possible bending effect with changing temperature is restricted or excluded.

The substrate of the panel can be composed in various possible manners. Below, some possibilities are summed up, without being exhaustive.

According to a first possibility, the panel comprises at least two such layers on the basis of thermoplastic material. These layers may be situated directly on top of each other or may be separated by one or more intermediate layers, such as a glass fiber cloth or glass fiber fleece. According to this first possibility, the thickness of the panel preferably is formed by these layers for 40 percent or more, or even for one half or more thereof. In other words, the substrate of the panel, thus, the layers which are situated underneath the decor, substantially can be formed by such layers with thermoplastic material and individual fibers. It is evident that in this manner the extent of expansion or shrinkage with temperature variations can be reduced in an expedient manner.

According to a second possibility, the panel comprises only one such layer on the basis of thermoplastic material and fibers. Such layer preferably is situated at least in the middle of the thickness of the panel and/or the substrate. The respective layer preferably forms at least. 10 percent and still better at least 50 percent of the thickness of the panel and/or the substrate. The remainder of the thickness of the substrate then can be formed by layers of thermoplastic material, which then do not necessarily comprise fibers, and/or by one or more glass fiber cloths or glass fiber fleeces. It is not excluded that the respective layer forms more than 80 percent or even the entire substrate.

Preferably, the substrate has a thickness of 1.3 to 10 millimeters. The entire floor panel preferably has a thickness situated between 2 and 6 millimeters. Preferably, the substrate forms at least one half of the thickness of the floor panel.

On the underside of the substrate, a counter layer or underlay can be provided, preferably a vapor-tight layer. Such counter layer or underlay preferably consists of a thermoplastic synthetic material layer. The counter layer preferably has a thickness which corresponds to the thickness of the top layer, including a possible backing layer, however, preferably is made thinner. The counter layer preferably functions as a balancing layer, such that a balanced sandwich structure can be obtained, namely without or only with minimal warping of the panels.

Preferably, said thermoplastic material of the layer which, according to the invention, comprises the individual fibers, further also comprises fillers, such as limestone.

A lacquer layer can be applied as the uppermost layer of the panel. Herein, this may relate to a UV- or electron beam-hardening lacquer layer or to a PU lacquer layer.

Preferably, the invention is applied with floor panels which, at the respective edges, are provided with mechanical coupling means allowing to couple two of such floor panels to each other in such a manner that a locking is created in a vertical direction perpendicular to the plane of the coupled panels, as well as in a horizontal direction perpendicular to the coupled edge .and in the plane of the panels. Preferably, the coupling means also show one or a combination of two or more of the following features:

- the feature that the mechanical coupling means or coupling parts are substantially realized as a tongue and a groove bordered by an upper lip and a lower lip, wherein this tongue and groove substantially are responsible for the locking in said vertical direction, and wherein the tongue and the groove are provided with additional locking parts, substantially responsible for the locking in said horizontal direction. Preferably, the locking parts comprise a protrusion on the lower side of the tongue and a recess in the lowermost groove lip. Such coupling means and locking parts are known, for example, from WO 97/47834;
- the feature that the mechanical coupling means or coupling parts press the coupled floor panels against each other, for example, in that these mechanical coupling means are provided with a so-called pre-tension, as known as such from EP 1 026 341. The tensioning force with which the floor panels are pressed against each other or towards each other, can be obtained, for example, in combination with the above feature, by means of a lower lip, which is bent out in coupled position and which, when trying to spring back, presses against the lower side of the tongue;
- the feature that the mechanical coupling means allow a coupling by means of a horizontal, or quasi-horizontal shifting movement of the panels towards each other;
- the feature that the mechanical coupling means allow a coupling by means of a turning movement W along the respective edges;
- the feature that the mechanical coupling means allow a coupling by means of a downward-directed movement of a male coupling part having, for example, a tongue, up into a female coupling part having, for example, a groove. With this type of panels, there is a high risk that the connection will get released with an expansion or pressing upward of the panels, as in such case the locking in vertical direction can be weak;
- the feature that the mechanical coupling means, or at least the pertaining upper edge, are realized by means of a milling operation with rotating milling tools.

Preferably, said coupling means substantially are realized in said substrate, more particularly at least in the layer which, according to the invention, comprises the loose fibers. Preferably, said coupling means are provided by means of a milling operation with rotating milling tools. Preferably, the floor panel of the invention relates to a rectangular, either oblong or square, panel, which is provided with mechanical coupling means on both pairs of opposite edges.

Panels which are provided with coupling means preferably have a thickness of at least 2.5, still better at least 3 millimeters. Due to the presence of said individual fibers, it becomes possible to provide reliable coupling means in panels of 4 millimeters or less, too. As the obtained panels have higher dimensional stability, the coupling means will be less strained and can be made smaller.

It is not excluded that the invention is applied for panels which are free from coupling means at their edges, wherein these panels then are intended for being glued to the underlying surface with their lower side. Such panels preferably have a thickness of less than 4 millimeters, however, preferably of more than 1.5 millimeters.

The panels of the invention preferably have a width of 8 centimeters or more. Particularly preferred dimensions are a width situated between 14 and 22 centimeters and a length situated between 118 and 220 centimeters. It is clear that this relates to panel-shaped elements and thus not to wall-to-wall floor covering. However, the panel-shaped elements do not necessarily have to be rigid, but can be rollable. In particular, the invention relates to so-called L VT (luxury vinyl tile) in plank format or in tile format.

When using individual E-glass fibers having a length of 3.2 millimeters in a soft PVC with 20 percent by weight of plasticizer, the inventors have found, with a heating from 20° C. to 120° C., an expansion of only 0.05%, whereas with a similar sample, without application of the individual fibers, an expansion of 0.35% was found. With cooling, similar values, then, however, for shrinkage were noted.

According to an independent second aspect, the invention also relates to a method which can be applied for manufacturing panels with the characteristics of the first aspect or the preferred embodiments thereof, however, which can also be applied more widely. To this aim, the invention relates to a method for manufacturing panels, wherein said method comprises at least the step of forming a layer of thermoplastic material, with the characteristic that the formed layer comprises individual fibers preferably having a length greater than 1 millimeter.

According to a particular preferred embodiment, said layer is formed on the basis of a granulate of said thermoplastic material. Preferably, the granules of this granulate consist for at least 50 percent by weight or for 60 to 80 percent by weight of fillers, '—such as chalk. This granulate can be, for example, initially strewn or otherwise deposited on an underlying surface, after which this granulate is consolidated to a thermoplastic layer by means of a, preferably heated, press treatment. According to the most preferred embodiment, the granulate is deposited, or possibly strewn, on a transport device and is guided between the belts of a continuous pressing device, where consolidating is performed or at least is initiated. According to the present particular preferred embodiment, to this aim a device can be applied, such as the one known from WO 2012/016916. Preferably, the granulate has an average particle size of 1 to 3 millimeters, or of approximately 2 millimeters. According to a particular embodiment, use is made of so-called micro granulate or granulate of an average particle size of less than I millimeter, such as, for example, with a granulate of approximately 800 micrometers. It is possible to work with granulates of less than 350 micrometers, or even, still better, of 100 micrometers or less than 100 micrometers. Such small granulates preferably are obtained otherwise than solely by breaking down still larger particles, but rather by solidifying the thermoplastic material. Solidification then will be performed, for example, by quenching (English: quenching) in a liquid. This particular technique for forming granulate leads to a more spherical shape of the particles in the obtained granulate. By making use of granulates smaller than 1 millimeter, or micro granulate, possibly obtained by solidification, a more uniform composition of the respective thermoplastic layer can be obtained. The individual fibers of the invention will have an even better effect when they are situated m a layer on the basis of such granulate.

The individual fibers can also be strewn or be incorporated in the granules of the strewn granulate.

The use of the above-mentioned micro granulate also has advantages when the final layer does not comprise any individual fibers. Therefore, the invention, according to a particular independent aspect, also relates to a method for manufacturing panels, wherein this method comprises at least the step of forming a layer of thermoplastic material, with the characteristic that said layer is formed on the basis of a strewn granulate of said thermoplastic material and that said granulate has an average particle size of less than 1 mm, and still better an average particle size of 350 micrometers or less, or 100 micrometers or less. Preferably, the average particle size is larger than 25 micrometers, such that caking of the granulate is prevented and good flow properties of the granulate are maintained. It is clear that such method has preferred embodiments, which correspond to the preferred embodiments of the method of the second aspect, without the necessity of having to apply individual fibers. It is clear that preferably soft PVC is applied as the thermoplastic material and that the respective thermoplastic layer preferably further also comprises fillers, such as chalk or lime. These fillers may or may not be supplied via the respective granulate. Preferably, the granulate comprises more than 50 percent by weight of fillers and still better between 60 and 80 percent by weight of fillers, for example, approximately 70 or 72 percent by weight. By applying highly filled granulate, a better distribution of the fillers in the layer to be realized is obtained, as well as a smooth production process. Further, it is clear that this method can be applied for manufacturing floor panels similar to those of the first aspect or the preferred embodiments thereof, without the necessity of having to apply the individual fibers mentioned there.

According to another embodiment of the second aspect, said layer is formed on the basis of an extruded thermoplastic material. Herein, this may relate, for example, to material obtained by means of a so-called Banbury mixer (Kobe Steel Ltd.), in which granules of the respective thermoplastic material are kneaded, wherein the kneaded material, for example, at least between a set of rollers, is extruded to a layer. Herein, the risk is created that the fibers are broken down during mixing.

Also according to the above two particular preferred embodiments, said granulates preferably comprise at least a portion of said individual fibers, preferably glass fibers.

It is evident that the layer obtained in the aforementioned step then must be processed together with other material, whether or not in layers, for forming the final panel. It is also possible that in the first place plates or sheets are obtained, from which a plurality of such panels is obtained by subdividing them.

Processing the respective layer generally can be performed in various manners. According to a first possibility, by means of heat and pressure the respective layer, at least at the surface, is melted together with one or more further thermoplastic layers, such as a printed decor film and/or a wear layer and/or a further substrate layer. According to a second possibility, the material of one or more further layers, in particular one or more further substrate layers, is provided in liquid form or in paste form by calendering it or providing it on the already formed layer in another manner. According to a third possibility, the layer, which according to the invention comprises the fibers, is provided on already formed other layers, for example, on a glass fiber fleece or on a glass fiber cloth and/or on a further, already formed substrate layer.

Preferably, the method of the invention comprises the step of providing a glass fiber layer, preferably a glass fiber fleece or "non-woven", in the respective layer.

It is noted that the transparent wear layer, when applied, preferably is free from fibers, such as glass fibers. When use is made of a decor film, this latter, too, preferably is free from such individual fibers. For the decor film, preferably a printed hard PVC film is applied, namely, a PVC film which is free or almost free from plasticizers. The use of a hard PVC film leads to a print of a higher quality, as it is less subject to dimensional changes during printing. This is particularly advantageous when during printing one or more drying treatments by means of heat supply are performed, as may be the case when printing with water-based pigmented inks. For the transparent wear layer, use can be made of a soft PVC layer, for example, with an amount of plasticizers of 12 percent by weight or more.

According to a third independent aspect, the present invention also relates to a material which can be applied in the method of the second aspect and/or of the preferred embodiments thereof. To this aim, the invention relates to a granulate for forming thermoplastic material, wherein this granulate, apart from the respective thermoplastic material, also comprises glass fibers preferably having an average length greater than I mm, and still better having an average length of 3 millimeters or more. Possibly, the granulate can comprise fillers, such as lime or chalk. In such case, the granulate preferably comprises at least 50 percent by weight or from 60 to 80 percent by weight of fillers, such as chalk.

It is evident that the thermoplastic material further can have the compositions stated in the context of the first aspect. Preferably, the thermoplastic material relates to a feedstock for forming semi-rigid or soft PVC. Preferably, this PVC comprises an amount of plasticizer of more than 12 percent by weight, for example, of 20 percent by weight or more.

It is clear that, according to the invention, by "substrate" an inner layer of the floor panel itself is meant, which as such can be made single- or multi-layered, however, wherein the respective layer or layers preferably have a common thickness which is larger than one half of the thickness of the entire panel concerned and/or wherein the respective layer or layers have a common weight which preferably is higher than one half of the weight of the entire panel concerned. Preferably, the contour of the possible coupling means is substantially or entirely realized in the substrate.

Further, it is clear that by "fibers", elongate particles are meant. Preferably, the length of such fiber is at least hundred times the average diameter thereof. Preferably, this relates to fibers with a circular or approximately circular cross-section.

BRIEF DESCRIPTION OF THE DRAWINGS

With the intention of better showing the characteristics of the invention, hereafter, as an example without any limitative character, some preferred embodiments are described, with reference to the accompanying drawings, wherein.

DETAILED DESCRIPTION OF THE INVENTION

Figure 1:
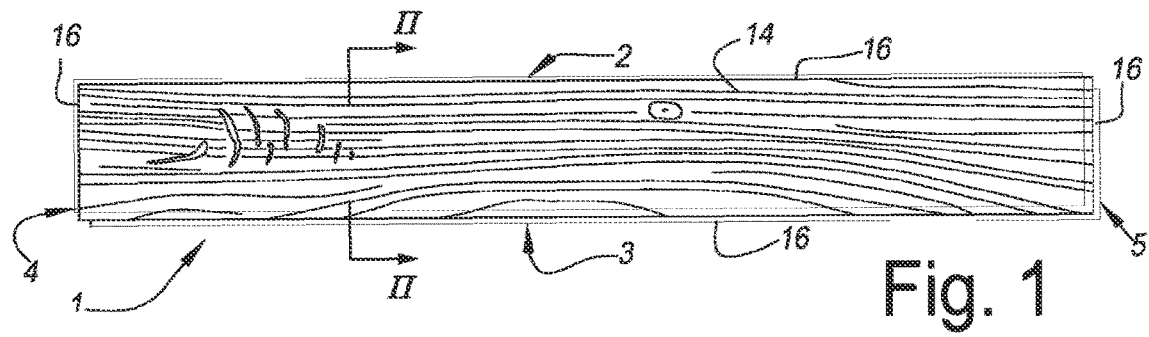
FIG. 1 represents a panel with the characteristics of the invention.

FIG. 1 represents a rectangular and oblong floor panel 1 with a pair of long sides 2-3 and a pair of short sides 4-5.

Figure 2:
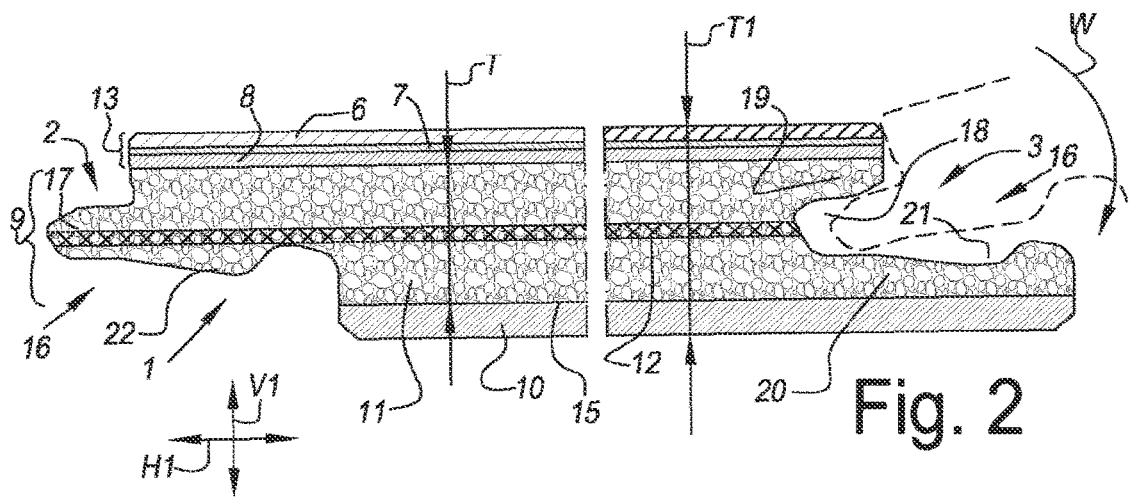
FIG. 2, at a larger scale, represents a cross-section according to lines II-II in FIG. 1.

FIG. 2 represents that the respective floor panel 1 is composed of various layers 6-7-8-9-10.

The substrate 11 is formed by a layer 9 of thermoplastic material, in this case soft PVC, which comprises individual fibers, such as glass fibers. The respective substrate layer 9 further comprises an embedded glass fiber fleece 12. Above the respective layer 9, a top layer 13 is provided, which as such comprises a printed decor film 7 and a transparent wear layer 6 on the basis of thermoplastic material. The top layer 13 further also comprises a backing layer 8 located underneath the decor film 7. In the example, the backing layer 8, the decor film 7 and the wear layer 6 are made on the basis of polyvinyl chloride. Preferably, the decor film 7 is made as a printed hard PVC film, whereas the wear layer 6 and possibly the optional backing layer 8 preferably are realized on the basis of soft PVC, namely with an amount of plasticizer of 12 percent by weight or more.

In the example, the decor film 7 is provided with a print with a wood pattern 14, wherein, per panel 1, each time the image of a single wooden board is provided.

On the lower side 15 of the substrate 11, a counter layer 10 is provided, which is also based on soft PVC.

FIG. 2 represents that the layer 9 comprising the fibers is present at least in the middle of the thickness T of the substrate 11. In this case, the respective layer 9 forms the entire substrate 11.

FIG. 2 further also represents that the respective layer 9 comprising the individual fibers constitutes at least 40 percent and here even more than one half of the thickness T of the panel 1.

Further, the panel 1 of the example is provided with mechanical coupling means or coupling parts 16 on both opposite edges 2-3. FIG. 2 shows that at least the mechanical coupling means 16 on the long pair of edges 2-3 allow that two of such floor panels 1 can be coupled to each other in such a manner that a locking is created in a vertical direction VI perpendicular to the plane of the coupled panels 1, as well as in a horizontal direction HI perpendicular to the coupled edges 2-3 and in the plane of the panels 1. The illustrated coupling means 16 show the characteristic that they are substantially realized as a tongue 1 7 and a groove 18 bordered by an upper lip 19 and a lower lip 20, wherein said tongue 17 and groove 18 substantially are responsible for the locking in said vertical direction V 1, and wherein the tongue I 7 and the groove 18 are provided with additional locking parts 21-22 substantially responsible for the locking in said horizontal direction Hl. In this case, the locking parts comprise a protrusion 21 on the lower side of the tongue 17 and a cooperating-therewith recess 22 in the lower lip 20.

The coupling means 16 represented here allow at least a coupling by means of a turning movement W along the respective edges 2-3.

The mechanical coupling means 16 are substantially realized in the layer 9, which, according to the invention, comprises the individual fibers. In the example, they are provided by means of a milling treatment, for example, by means of rotating tools.

Figure 3:
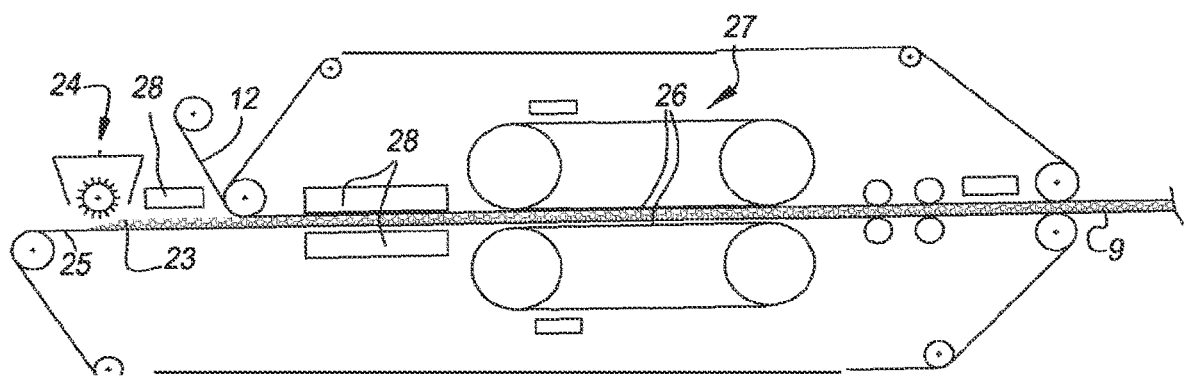
FIG. 3 schematically represents some steps m a method with the characteristics of the second aspect.

FIG. 3 represents some steps of a method for manufacturing the panel of FIGS. 1 and 2. More particularly, the step is represented of forming the layer 9 with thermoplastic material, which, according to the invention, comprises the individual fibers.

In the example of FIG. 3, the respective layer 9 is formed on the basis of a granulate 23 of the respective thermoplastic material. Herein, this relates to a granulate 23 with the characteristics of the third aspect, wherein the granules also comprise glass fibers.

FIG. 3 represents that the granulate 23 initially is deposited on a transport device 25 by means of a strewing device 24, after which it is consolidated between the belts 26 of a continuous pressing device 1 7. Herein, the granulate 23 is transported along one or more heating devices 28 and possibly it can be cooled again after the press treatment or at the end of the press treatment. By cooling, it is achieved that the pressed plates, sheets or layers relatively fast are manageable for further processing.

FIG. 3 further also represents that simultaneously with pressing, a further layer, in this case the glass fiber layer 12, can be applied or inserted by providing it on or between the granulate 23 in the press treatment. This may relate, for example, as aforementioned, to a glass fiber layer 12 or to a backing layer 8, a decor film 7 or a wear layer 6. It may also relate to a composition of layers already laminated together, such as an already entirely or partially composed top layer 3, which, for example, comprises at least a decor film 7 and a wear layer 6, or at least a backing layer 8 and a decor film 7; or the backing layer 8, decor film 7 as well as the wear layer 6. A possible superficial lacquer layer preferably is provided after the press treatment. This is not represented here. According to another, not represented possibility, at least a decor film 7 or a wear layer 6, or possibly a combination of both, is provided after the granulate 23 already has been pressed at least partially, preferably already has been pressed at least to a coherent whole. In this last case, the already pressed layer on the basis of granulate preferably is ground before the remaining layers 6-7 are provided thereon. For providing the decor film 7 and/or the wear layer 6, preferably again use is made of a continuous pressing device. Instead of a grinding treatment, it is also possible to work with levelling, for example, by means of a plastisol.

The present invention is in no way limited to the herein above-described embodiments; on the contrary, such panels, methods and granulates can be realized according to various variants, without leaving the scope of the present invention. Moreover, the panels, instead of as floor panels, can also be realized as wall panels or ceiling panels or even as furniture panels.

The invention claimed is:

1. A method of manufacturing panels, wherein said panels comprise a single-layered substrate and a provided thereon top layer, wherein said substrate has a thickness larger than one half of the thickness of an entirety of a panel, said method comprises at least the step of forming a layer of thermoplastic material, wherein said layer of thermoplastic material is formed on a basis of a granulate comprising granule particles of said thermoplastic material, wherein said granule particles are filled with fillers, and wherein said granulate has an average particle size of less than 1 mm;

wherein said layer of thermoplastic material is formed by extruding said granulate, said layer of thermoplastic material forming said substrate;

wherein said method further comprises providing said top layer with at least a printed decor and a translucent or transparent wear layer above said layer of thermoplastic material, wherein said printed decor and said transparent wear layer are free from fibers.

2. The method according to claim 1, wherein said granulate has an average particle size of 350 micrometers or less.

3. The method according to claim 1, wherein said granulate has an average particle size which is larger than 25 micrometers.

4. The method according to claim 1, wherein said thermoplastic material is selected from the group consisting of polyvinyl chloride, polypropylene, polyethylene or polyurethane.

5. The method according to claim 4, wherein said thermoplastic material is polyvinyl chloride (PVC).

6. The method according to claim 5, wherein said polyvinyl chloride (PVC) is a semi-rigid or soft PVC, having a plasticizer content of more than 12 percent by weight.

7. The method according to claim 1, wherein said granulate particles comprise more than 50 percent by weight of fillers.

8. The method according to claim 1, wherein said method further comprises providing a lacquer layer as the uppermost layer of the panel.

9. The method according to claim 1, wherein said panel is a floor panel.

10. The method according to claim 9, wherein said method further comprises providing said floor panel, at respective edges, with mechanical coupling means allowing to couple two of such floor panels to each other in such a manner that a locking is created in a vertical direction perpendicular to a plane of coupled panels, and in a horizontal direction perpendicular to a coupled edge and in the plane of the panels.

11. The method according to claim 10, wherein said mechanical coupling means are provided by means of a milling operation with rotating milling tools, and are substantially realized in said substrate.

* * * * *